US008169438B1

(12) United States Patent
Baraff et al.

(10) Patent No.: US 8,169,438 B1
(45) Date of Patent: May 1, 2012

(54) TEMPORALLY COHERENT HAIR DEFORMATION

(75) Inventors: David Baraff, Oakland, CA (US); Michael Fong, Novato, CA (US); Christine Waggoner, Berkeley, CA (US)

(73) Assignee: Pixar, Emeryville, CA (US)

( * ) Notice: Subject to any disclaimer, the term of this patent is extended or adjusted under 35 U.S.C. 154(b) by 866 days.

(21) Appl. No.: 12/059,863

(22) Filed: Mar. 31, 2008

(51) Int. Cl.
*G06T 13/00* (2011.01)
(52) U.S. Cl. .................. 345/473; 345/474; 345/475
(58) Field of Classification Search ........... 345/473–475
See application file for complete search history.

(56) References Cited

U.S. PATENT DOCUMENTS

2006/0109274 A1* 5/2006 Alvarez et al. ................ 345/473

OTHER PUBLICATIONS

Ward, Kelly, and Ming C. Lin. "Adaptive Grouping and Subdivision for Simulating Hair Dynamics." Computer Graphics and Applications, 2003. Proceedings. 11th Pacific Conference on Computer Graphics and Applications (2003): 234-43.*
A Survey on Techniques for Computing Penetration Depth—Shashidhara K. Ganjugunte uploaded to the internet May 1, 2007.*

* cited by examiner

*Primary Examiner* — Xiao M. Wu
*Assistant Examiner* — Scott E Sonners
(74) *Attorney, Agent, or Firm* — Kilpatrick Townsend & Stockton LLP

(57) ABSTRACT

In various embodiments, deformations caused by kinematic or reference objects to secondary objects such as hair or fur may be computed in parallel using a temporally coherent deformation technique. A single or uniform direction for a deformation may be determined from which the deformation of the secondary object will occur with respect to a reference object. The uniform direction for the deformation may be determined rather than allowing the direction of the deformation to vary along a dimension of the secondary object. The magnitude of the deformation may be determined to vary along the dimension of the secondary object in response to the penetration depth or the measure of how far inside the secondary object finds itself within the reference object.

21 Claims, 8 Drawing Sheets

TEMPORALLY COHERENT HAIR DEFORMATION

BACKGROUND OF THE INVENTION

This disclosure relates to computer graphics. More specifically, the disclosure relates to techniques for providing temporally coherent deformations of objects, such as hair.

The motions of secondary elements in computer graphics imagery such as hair or cloth are often too complex for an animator to directly control. Instead of a human animator determining the motion of these secondary elements, some computer programs use physically-based numerical methods and techniques to simulate their motion over time. For hair, this is sometimes accomplished by modeling the physical properties of the hair (e.g., how the hair reacts due to forces or collisions with solid objects, how the hair deforms or collides with itself, or the like), the external forces on the hair (gravity, wind), the motions of kinematic or reference elements (e.g., the characters or objects upon which the hair is placed), or the like.

In many cases, the animation of kinematic or reference elements is specified and is independent of and/or unaffected by the motion of the dynamic elements (e.g., the hair). As a concrete example, consider an animation of a character, having several hundreds of thousands, to millions of strands of hair or fur upon the character. In various embodiments, the character (the kinematic or reference element) is directly animated by a skilled human animator. However, the motion of the hair (the dynamic element), in response to the character's animation, is simulated by a computer simulation program using physically-based numerical techniques.

If the physical properties and external forces acting on the dynamic elements are accurately modeled, the resulting motion is often "plausible" and seemingly realistic to a viewer. In other words, it will appear to a viewer that the hair hangs down naturally, and that the hair reacts naturally in response to the character's motions. The process of determining the motion of hair or fur over time in reaction to an object's movement (e.g., a character's movements) is called herein a "simulation process," while the software/computer hardware that performs the process is called herein a "simulation system." Typically, the software and mathematics underlying physical simulations of this nature are highly complex.

It has been determined by the inventors, that for any number of reasons, a simulation system may produce output motion that typically is mostly, but not completely, correct with regard to interpenetrations between the hair and other objects or reference elements. A challenge is to ensure that at every frame, the position of the hairs avoids interpenetrations. One way to do this is to change the geometry of the hair to avoid the interpenetrations, e.g., bend or otherwise deform the hair around objects, rather than simply passing through them. For large magnitude deformations, it is extremely important that the displacement vary smoothly from frame to frame of the animation, or one quite easily sees hair that jumps about, in a seemingly random fashion. In other words, hair deformations must be temporally coherent.

One way to introduce coherence is by maintaining history of a hair's deformation. For example, if a hair's deformation (if any) is known at a previous point in time, and a small step is taken forward in time (e.g., small enough so that movement of a reference object is small), then the hair does not require a deformation very far from its last state to remove interpenetrations. Using "history" (i.e., the known previous state) in this manner allows one to use any number of simulation-based techniques that guarantee a temporally coherent outcome.

However, using history adds a serious restriction because it requires one to compute the deformations of the hair in sequential time-wise order. In particular, the deformation of the hairs at some frame N cannot be determined without first determining its deformation at frame N–1, and so on. This may not seem a serious restriction, since the process of physically simulating hair itself may already has this dependence on history. (The simulation system must compute the motion of the hair at frame 1, then frame 2, etc.) However, hair simulation systems typically simulate the motion of only a very small number of hairs (for example, some few thousands). In contrast, a rendering program can extrapolate the geometry of "millions" of hair, based upon those few thousands of hairs computed by the simulation system, and may draw all those millions of hairs in the final output image. Yet all of those millions of hairs, at each frame of the animation, may need to be free of interpenetrations.

If the deformation state of these millions of hairs at any frame is made to depend upon the deformation state at the previous frame, then the rendering process must render frames in time-wise order, from first to last, maintaining a history of each hair's deformation state over time. This is an unacceptable requirement because today's production environments depend on being able to distribute the rendering of a sequence of frames over many computers. For example, in a one hundred frame sequence of animation, it is typical for each of those one hundred frames to be rendered by a separate computer at the same time. Doing so requires that the computations for each frame be independent of all other frames. However, by requiring that the deformation of a hair at frame n depend upon its deformation at frame n–1, we require that the frames be computed sequentially, rather than in parallel. However, requiring that the deformation of a hair at frame n+1 depend upon its deformation at frame n, in turn requires that the frames be computed sequentially, rather than in parallel.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

In various embodiments, deformations caused by kinematic or reference objects to secondary objects such as hair or fur may be computer in parallel using a temporally coherent deformation technique. In general, a simulation program may determine simulation results associated with secondary objects. Deformations may be determined that correct or otherwise fix the state of the secondary objects. In some embodiments, a single or uniform direction is determined from which a deformation of a secondary object will occur with respect to a reference object. The single or uniform direction for the deformation is determined rather than allowing the direction of the deformation to vary along a dimension of the secondary object. Additionally, the magnitude of the deformation may vary along the dimension of the secondary object in response to the penetration depth or the measure of how far inside the secondary object finds itself within the reference object.

Accordingly, using the penetration depth to control the deformation magnitude yields a temporally coherent result because the amount of the interpenetration is continuous and smooth as a function of both the secondary object's and the reference object's position. Thus, deformations may be generated such that the displacement varies smoothly from frame to frame of an animation. Therefore, visually displeasing artifacts, such as hairs that jump about in a seemingly random fashion may be reduces and/or eliminated.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION

In various embodiments, systems and methods for deforming objects may provide animation of the objects that can be coherent over time. In one embodiment, an intersection between a first object and a second object can be detected. A direction for deforming the first object may be then determined based on the amount of interpenetration between the first object and the second object. In some embodiments, for example, the intersection between hair and clothing, and the amount of interpenetration of the hair (e.g., the penetration of the hair into the clothing) and clothing can be detected. The hair may then be deformed in response to the amount of interpenetration between the hair and the clothing.

Figure 1:
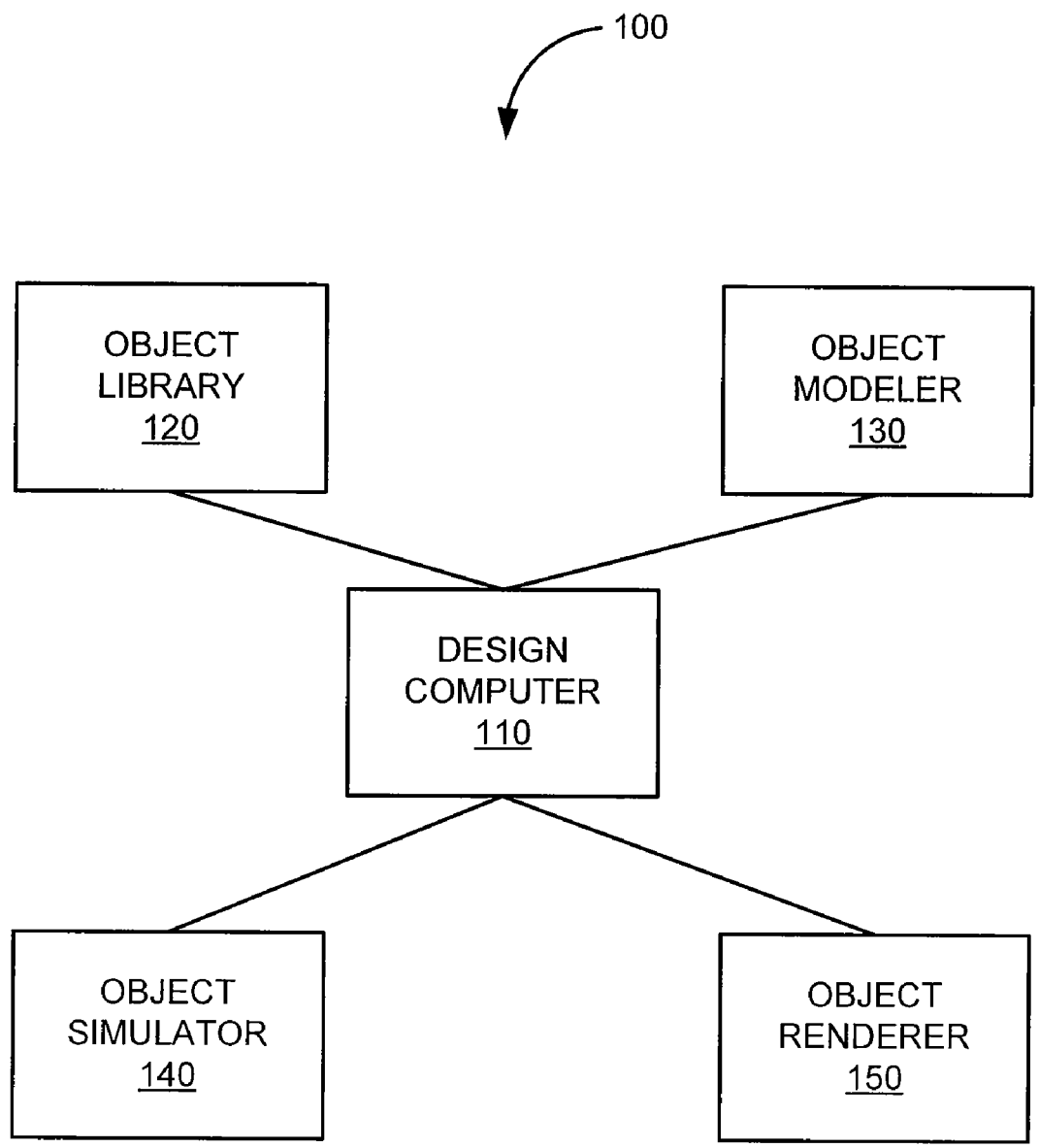
FIG. 1 is a simplified block diagram of a system for creating computer graphics imagery and animation that may incorporate embodiments of the present invention.

FIG. 1 is a simplified block diagram of system 100 for creating computer graphics imagery and animation that may incorporate embodiments of the present invention to provide temporally coherent deformation of objects. In this example, system 100 can include design computer 110, object library 120, object modeler 130, object simulator 140, and object render 150.

Design computer 110 can include hardware and/or software elements usable to design computer graphics imagery and animation. Some examples of design computer 100 may include PCs, laptops, workstations, mainframes, clusters, grids, or the like. Object library 120 can include hardware and/or software elements usable to store information related to computer graphics imagery and animation. Some examples of object library 120 may include files, libraries, databases, or other storage mechanisms objects that may be designed, posed, animated, simulated, rendered, or the like.

Object modeler 130 can include hardware and/or software elements usable to model objects related to computer graphics imagery and animation. Object modeler 130 may model objects to generate 2-D, 3-D, and n-D models associated with the objects. Models or object data may be stored in object library 120. Object simulator 140 can include hardware and/or software usable to simulate objects related to computer graphics imagery and animation. Object simulator 140 may simulate objects to generate simulation data associated with the objects. Object simulator 140 may incorporate one or more techniques or perform one or more types of simulations, such as using physically-based numerical techniques.

Object renderer 150 can include hardware and/or software elements usable to render objects related to computer graphics imagery and animation. Object renderer 150 may render objects to generate render data associated with the objects. For example, object renderer 150 may generate still images, animations, motion picture sequences, or the like of objects stored in object library 120.

System 100 may also provide additional capabilities (e.g., scanning, painting, analysis, editing, etc.) as desired. In various embodiments, system 100 may perform capabilities, functions, or tasks in batches, sequences, in parallel, or the like. Although FIG. 1 is described herein with reference to particular blocks and modules, it is to be understood that these blocks and modules are defined for convenience of description and are not intended to imply a particular physical arrangement of component parts. Further, the blocks/modules need not correspond to physically distinct components. For instance, those skilled in the art will appreciate that different combinations of hardware and/or software components may also be used and that particular operations or features described as being implemented in software might also be implemented in hardware or vice versa.

In some embodiments, a user, animator, modeler, artist, developer, or the like, may interact with one or more components of system 100 to generate objects, models, simulations, scenes, still images, animations, motion picture sequences, or the like. A computer generated image or animation scene may include any number of objects. Objects within the image or scene may be represented simple or complex representations. In one example, hair or fur may be represented as a linear object comprising a number of points whose motion and/or position is defined by a line. In another example, cloth may be represented by a mesh object comprising a number of points or cloth particles whose motion and/or position may be defined by references to neighboring particles or points on an object on which the cloth rests. In response to one or more collusion detection algorithms or routines, intersections between objects may be detected. System 100 may automatically determine deformations of objects that can be coherent over time which may reduce the time and cost needed for generating an animation.

Figure 2:
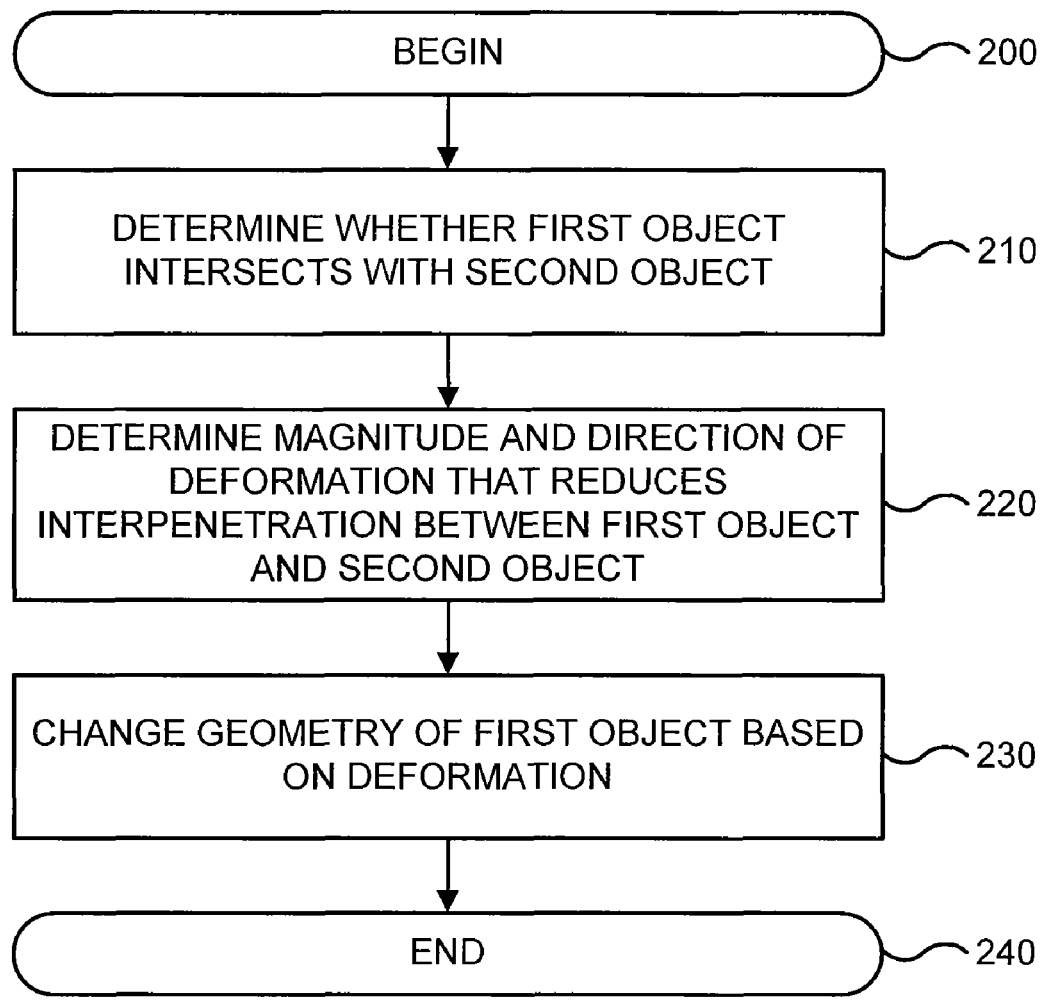
FIG. 2 is a flowchart of a method for deforming an object in one embodiment according to the present invention.

FIG. 2 is a flowchart of a method for deforming an object in one embodiment according to the present invention. The processing depicted in FIG. 2 may be performed by software modules (e.g., instructions or code) executed by a processor of a computer system (e.g., system 100 of FIG. 1), by hardware modules of the computer system, or combinations thereof. FIG. 2 begins in step 200.

In step 210, a determination is made whether a first object intersects with a second object. In various embodiments, an intersection includes a collision when two entities come together. A collision may include interpenetration between the two entities, touching of the two entities, and the two entities positioned within a predetermined threshold or limit (e.g., a predetermined distance). Interpenetration may include how much (e.g., volume) or how far (e.g., distance) one object finds itself within another object.

In step 220, magnitude and direction of a deformation is determined that reduces the interpenetration between the first object and the second object. The deformation may be determined such that the interpenetration between the objects is reduced and eliminated.

In step 230, the geometry of the first object is changed based on the deformation. The first object may be expanded, contracted, stretched, squished, translated, or the like to change its geometry. FIG. 2 ends in step 240.

Consider an example of an animation of a human character than can have several hundreds of thousands of strands of hair (e.g., a first object—or thousands of individual first objects) upon the character's head. A hat (e.g., a second object) may also be placed on the character's head. During the animation, the position of the hat on the character's head may slowly change over time.

Suppose that some hair is very close to passing through the bottom of the hat at time $t_1$, but does not actually intersect the hat. If, a short time later at $t_2$, the hat has moved slightly so that same hair now intersects the hat, a small deformation may be generated to remove the interpenetration. If this was not the case, then hairs that change from just missing the hat to intersecting the hat, would be seen to visibly jump. Additionally, hairs that were deformed because they hit the hat at time $t_1$, but no longer did at time $t_2$, would also be seen to jump. These jumps can cause undesirable visual effects in an animation.

In various embodiments, a simulation process associated with system 100 of FIG. 1 may generate deformations of objects, such as hairs, that have a deformation proportional to how much the objects intersect other objects. As a result, the deformations typically yield a temporally coherent result. In other words, the results of deformations of objects at any given time may be determined without referencing previous deformations of the objects. This temporal coherence may allow system 100 to render frames in parallel.

Figure 3:
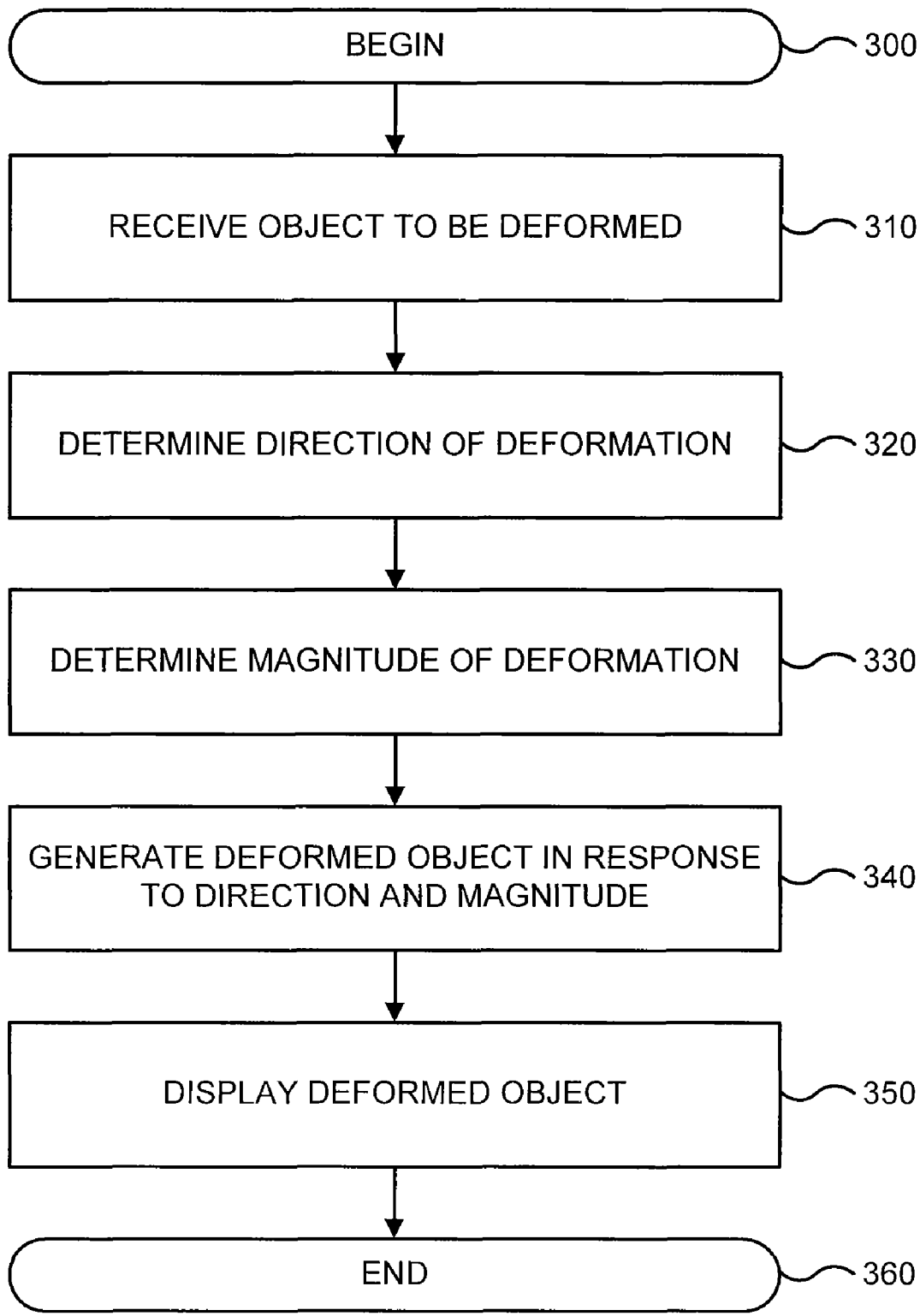
FIG. 3 is a flowchart of a method for generating a temporally coherent deformation of an object in one embodiment according to the present invention.

FIG. 3 is a flowchart of a method for generating a temporally coherent deformation of an object in one embodiment according to the present invention. FIG. 3 begins in step 300.

In step 310, an object to be deformed is received. For example, a simulation program associated with system 100 of FIG. 1 may receive information specifying or defining an object. The object may be specified by or defined by any number of techniques for format.

In step 320, a direction of a deformation is determined. In various embodiments, at each frame of an animation, a single direction of the deformation is determined for a given object. In practice, it may be extremely difficult to let the deformation direction vary up and down a hair, while still ensuring that each frame yields a correlating sequence of deformation directions. By providing each hair with a single direction of deformation, it becomes much easier to ensure a temporally coherent result.

In step 330, magnitude of the deformation is determined. The magnitude may include the size of the deformation, the weighting of the deformation, the scaling of the deformation, or the like. In step 340, a deformed object is generated in response to direction of deformation and magnitude of deformation. In step 350, the deformed object is displayed. FIG. 3 ends in step 360.

In various embodiments, the magnitude of the deformation determined in step 330 can be allowed to vary at points along the object. Varying the magnitude of the deformation may provide that the deformations are not reduced to mere spatial translations of the object (e.g., uniform movements of the entire hair in space, which would look visually unappealing). Because the magnitude may vary at any point along the object, the deformation magnitude at each point along the object may be a function of "penetration depth." In some embodiments, penetration depth may include a measure of how far inside a first object is within a second object. The penetration depth may include the amount of interpenetration.

In some embodiments, the amount of interpenetration may include the shortest distance that a point on the first object is to any point on the boundary of the second object (e.g., the shortest distance to get back to the surface or a predetermined region of the second object). In one embodiment, the amount of interpenetration may include a distance other then the shortest distance that a point on the first object is to any point on the boundary of the second object. The amount of interpenetration may include other measurements, such as volume, color, or the like.

In various embodiments, the penetration depth may be a continuous and smooth function of both positions of the first object and the second object. As a result, the penetration depth may be used to control the deformation magnitude. Accordingly, a temporally coherent result may be generated for the deformation. For example, given that the deformation direction determined in step 320 of FIG. 3 varies smoothly over time, the deformation for the object also varies smoothly over time.

Figure 4A:
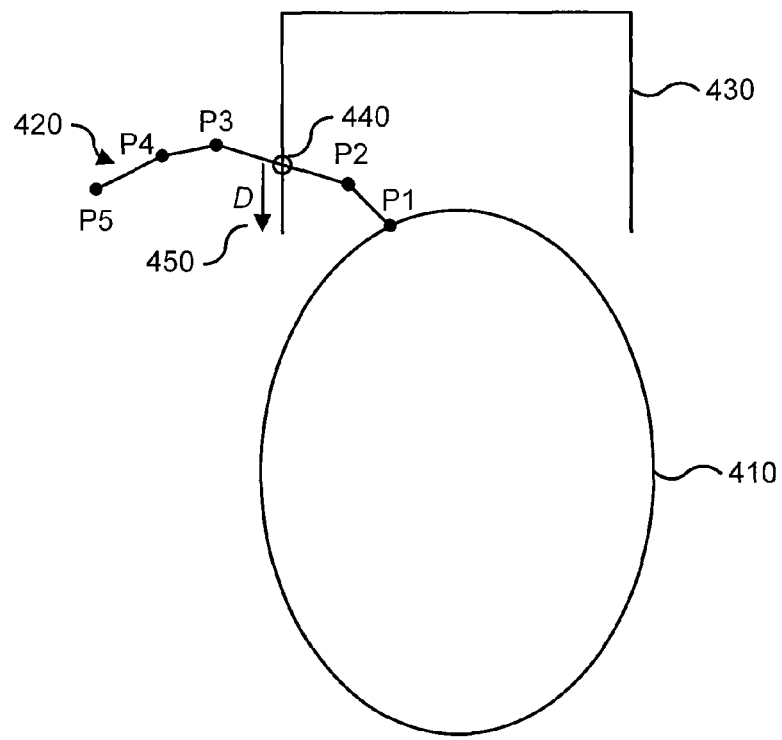
FIGS. 4A and 4B are illustrations of an interpenetration and corresponding deformation of an object in one embodiment according to the present invention.
Figure 4B:
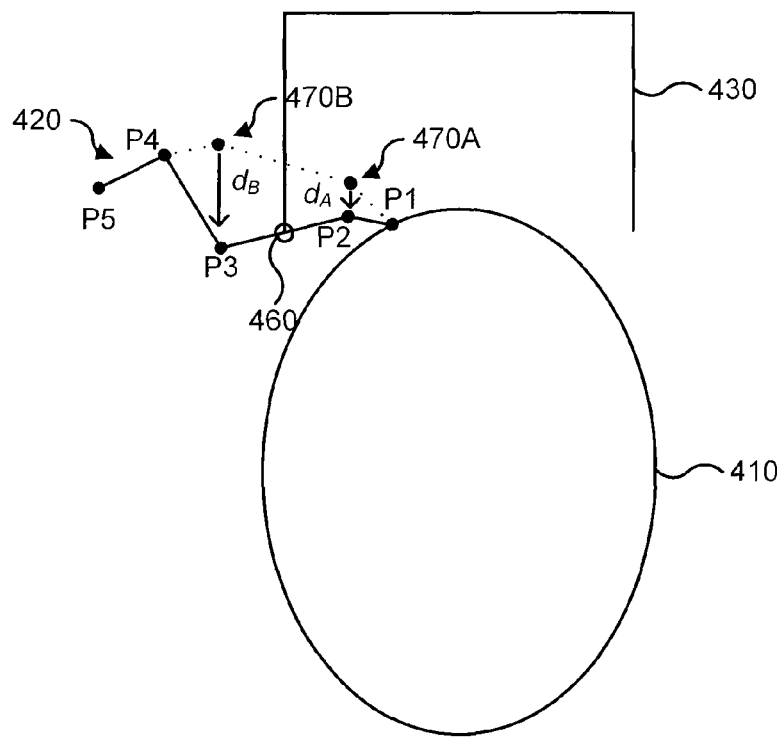

FIGS. 4A and 4B are illustrations of an interpenetration and corresponding deformation of an object in one embodiment according to the present invention. In this example, an animation of a human character with head 410 includes at least one hair 420. Hat 430 is placed on head 410 of the human character, causing hair 420 to intersect with hat 420 as shown in FIG. 4A.

Hair 420 includes a finite number of locations or "hair points" (e.g., P1 at the root attached to head 410, P2, P3, P4, and P5 at the end of hair 420) which define a piecewise-linear curve. (Typically the hair will be rendered more smoothly as a smooth curve, and not as a straight line; however, the geometric deviation between the two is generally small.) One or more forces, constants, and other animation variables or controls may define motion and/or position of the hair over time and in response to other forces and objects. Hair 420 intersects with hat 430 between P2 and P3 at location 440 (shown as a small open circle).

In some embodiments, the direction of deformation required to reduce or otherwise eliminate the interpenetration between hair 420 and hat 430 may be the same for every hair associated with head 410. Thus, the direction can be independent of the object (e.g., hair 420) itself. For example, the deformation direction may be simply straight down toward the bottom of hat 430, as indicated by direction 450 (shown as D).

In various embodiments, when hair 420 intersects hat 430, two hair points bounding the interpenetration (e.g., P2 and P3) can be moved downward as shown in FIG. 4B. Hair 420 may rest below and possibly outside the bottom of hat 430, between P2 and P3 at location 460 (shown as a small open circle). The magnitude of displacement may depend on the amount of interpenetration, such as how "high up" the interpenetration is between hair 420 and hat 430. Each hair point P2 and P3 may move proportionally the amount of interpenetration associated with the hair point and hat 430.

In some embodiments, hair points P2 and P3 move proportionally from their original positions 470 (e.g., P2 at position 470A and P3 at position 470B). In one embodiment, hat 430 may have no volume. Thus, the penetration depths at each hair point P2 and P4 (e.g., $d_A$ and $d_B$ respectively) may be the distance of interpenetration between hair 420 and hat 430 to outside of hat 430.

In various embodiments, each interpenetration may move the two hair points P2 and P3 based on the penetration depth. Each interpenetration may also be based on where the interpenetration occurs between the two hair points. For example, P3 may move in one direction, (e.g., downward out of hat 430) more than P2 may move in the same direction. This may be because the interpenetration along the object segment between P2 and P3 can be much closer to P3 than P2. Accordingly, the interpenetration as a whole may move in the same direction, for example, down to the bottom or exterior of hat 430. Thus, in various embodiments, the deformation magnitude may be a function of penetration depth, as well as position.

Figure 5:
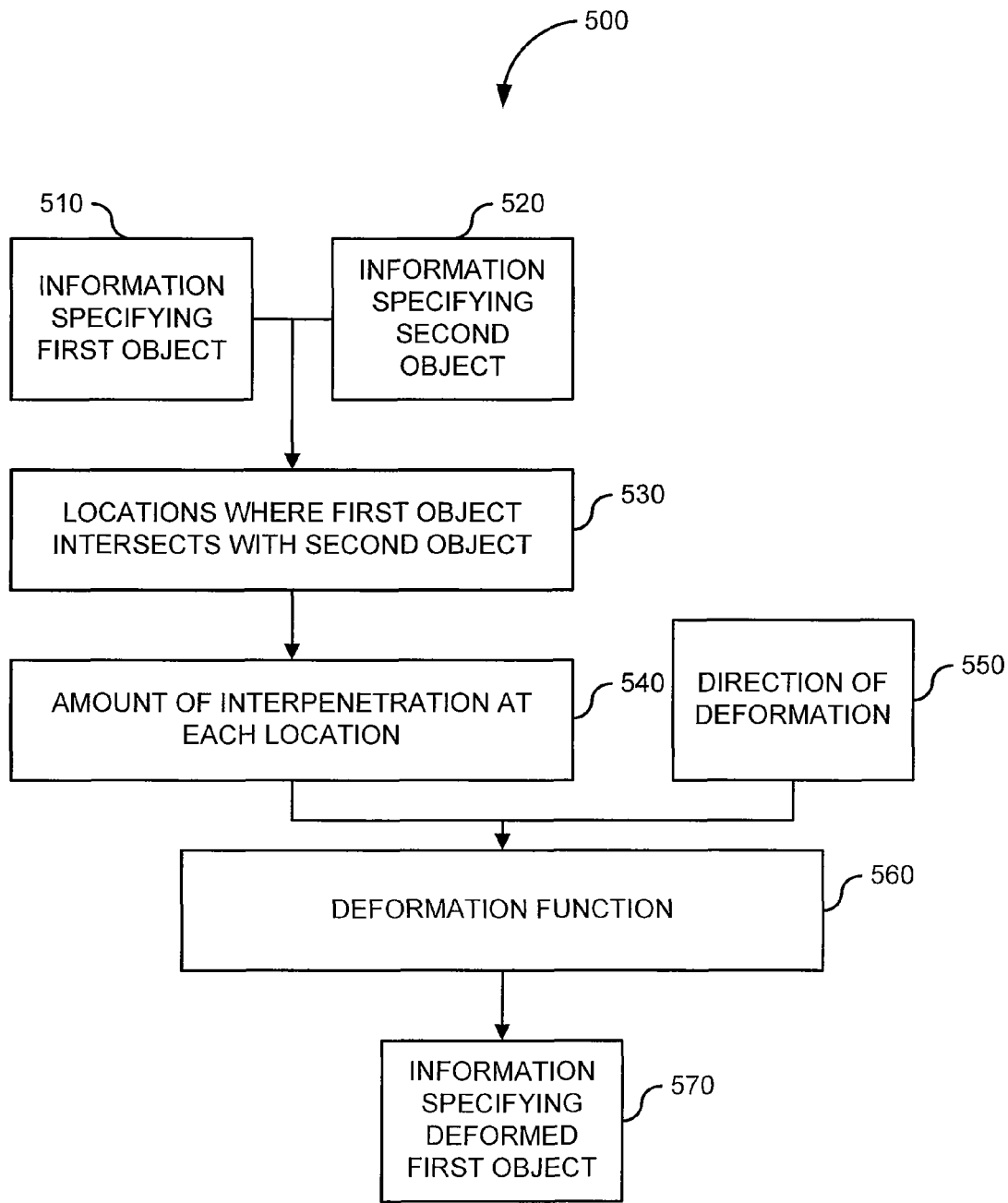
FIG. 5 is a block diagram illustrating a process flow for generating an object deformation in one embodiment according to the present invention.

FIG. 5 is a block diagram illustrating process flow 500 for generating an object deformation in one embodiment according to the present invention. Information specifying a first object is received in block 510. In block 520, information specifying a second object is received.

Locations where the first object and the second object intersect are determined in block 540. For example, a set of points that bound the interpenetration may be determined. In another example, a set of surfaces within the volume of the second object may be determined. The amount of interpenetration at each location is determined in block 540. As discussed previously, the amount of interpenetration may be the shortest path to a position that eliminates the interpenetration.

In block 550, a direction of the deformation is determined. The amount of interpenetration at each location and the direction of deformation may be supplied as parameters to a deformation function in block 560. In block 570, information specifying the deformed first object is generated or otherwise output.

Figure 6A:
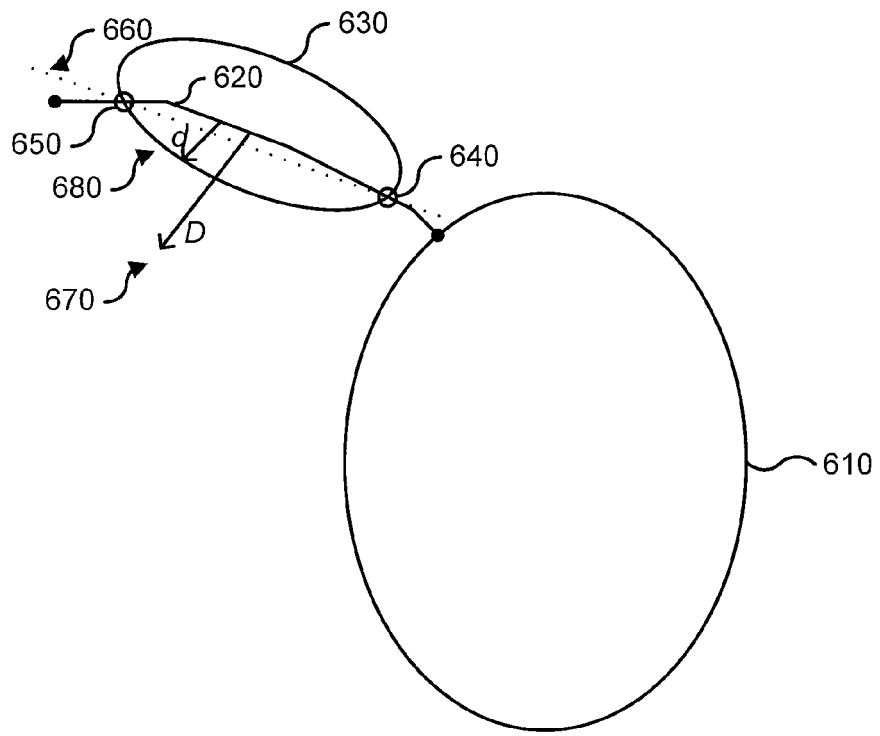
FIGS. 6A and 6B are illustrations of an interpenetration and corresponding deformation of an object in one embodiment according to the present invention.
Figure 6B:
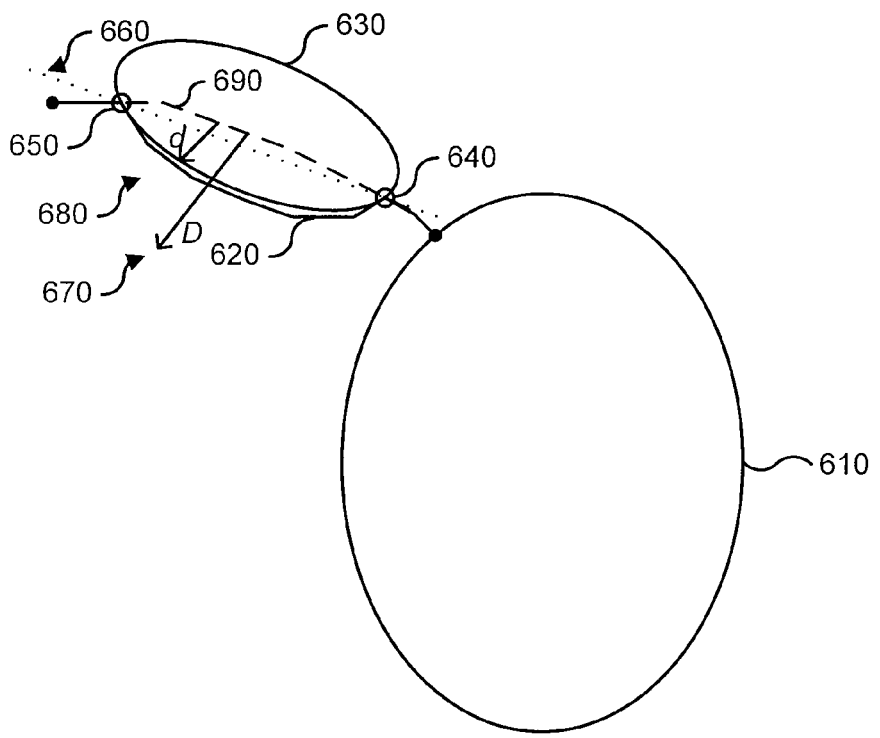

FIGS. 6A and 6B are illustrations of an interpenetration and corresponding deformation of an object in one embodiment according to the present invention. In this example, an animation of a human character with head 610 can include at least one hair 620. Object 630 may be placed on head 610 of the human character, which may cause hair 620 to intersect with object 630, as shown in FIG. 6A. Hair 620 may include a finite number of locations or "hair points." The locations or hair points may define or be defined by a piecewise-linear curve. Hair 620 may intersect with object 630 by entering object 630 at location 640 (shown as a small open circle) and exiting object 630 at location 650 (shown as a small open circle).

In various embodiments, a volume may be associated with object 630. Using "entry" and "exit" points or locations of hair 620 with object 630 (e.g., locations 640 and 650), a line 660 can be determined between entry location 640 and exit location 650. The direction of the deformation can be based upon line 660. Thus, the direction of deformation may depend on both hair 620 and the intersecting object 630. For example, the direction of the deformation may be orthogonal to line 660, such as direction 670.

In some embodiments, the magnitude of the deformation may be determined based on the amount of interpenetration between hair 620 and object 630. For example, the magnitude of the deformation may be based on how far each point of hair 620 was inside of object 630 (e.g., the penetration depth).

Object 630 may move into hair 620 (or vice versa) and yield a temporally smooth deformation of hair 620 over time. Accordingly, the deformation at each frame of an animation may be smooth over time, and thus computable independent of any other frames.

In various embodiments, once hair 620 may be deformed, system 100 of FIG. 1 may provide added realism to hair 620. Hair 620 may continue in the direction hair 620 was going after it "exits" object 630. The deformation of hair 620 thus may appear like object 630 is really pushing hair 620 down and out of the way.

Figure 7:
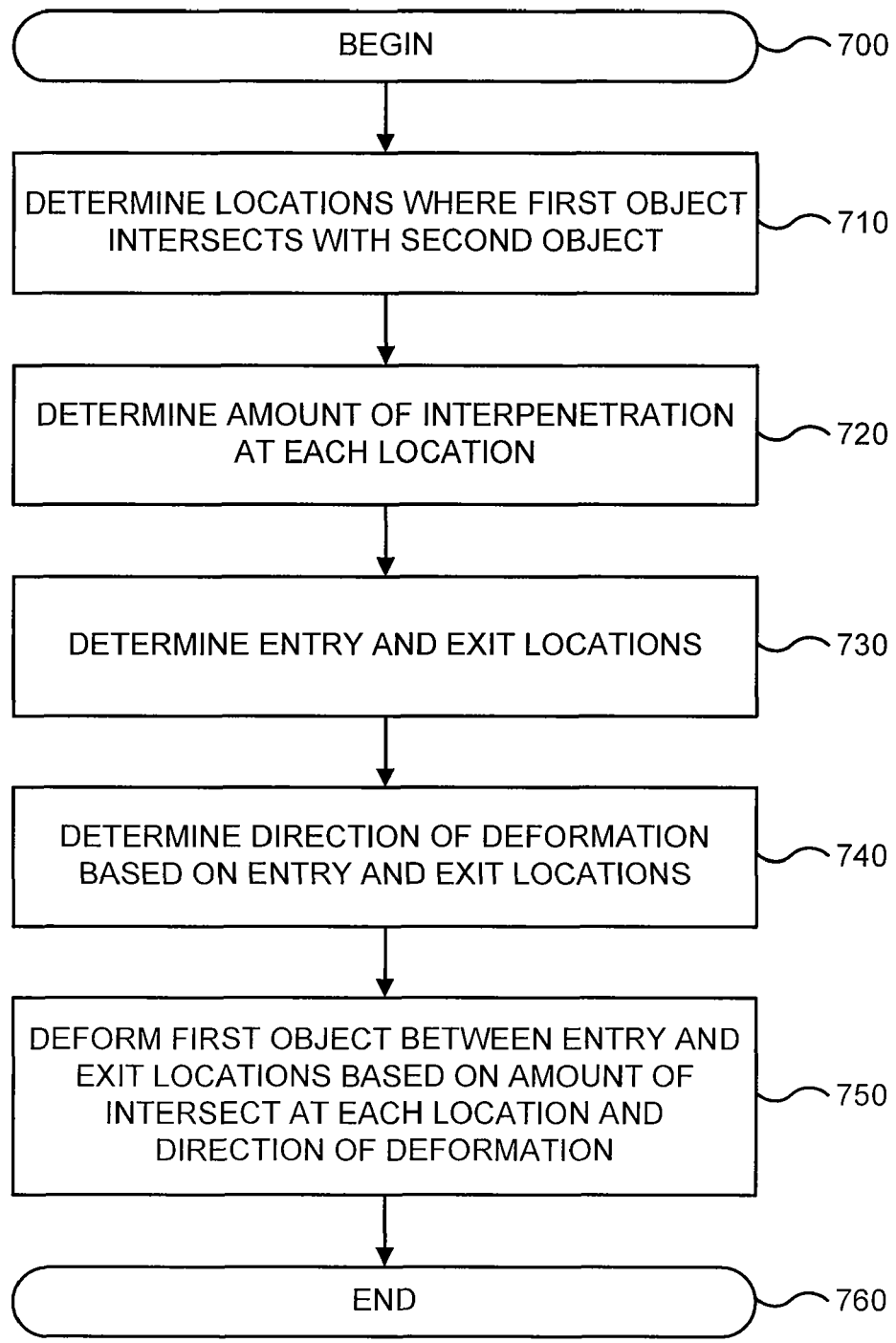
FIG. 7 is a flowchart of a method for generating a temporally coherent deformation of an object in one embodiment according to the present invention.

FIG. 7 is a flowchart of a method for generating a temporally coherent deformation of an object in one embodiment according to the present invention. FIG. 7 begins in step 700.

In step 710, locations where a first object intersects with a second object are determined. The locations may include points, curves, regions, surface region, or the like. In step 720, the amount of interpenetration at each location is determined. In step 730, entry and exit locations are determined. In step 740, direction of the deformation is determined based on the entry and exit locations.

In step 750, the first object is deformed between the entry and exit locations based on the amount of interpenetration at each location and the direction of the deformation. FIG. 7 ends in step 760.

Figure 8:
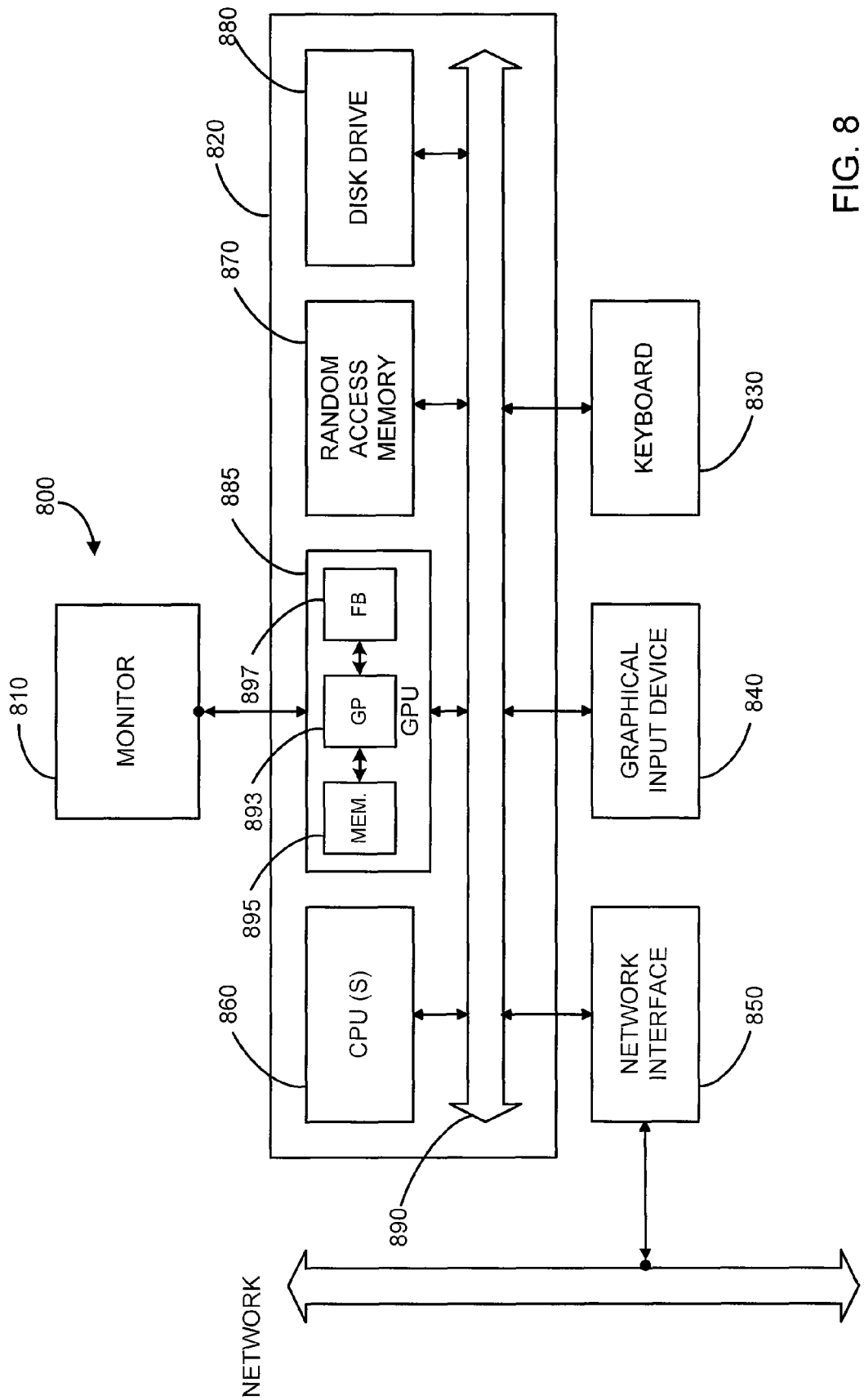
FIG. 8 is a block diagram of a system that may incorporate embodiments of the present invention.

FIG. 8 is a block diagram of computer system 800 that may be used to practice embodiments of the present invention. FIG. 8 is merely illustrative of an embodiment incorporating the present invention and does not limit the scope of the invention as recited in the claims. One of ordinary skill in the art would recognize other variations, modifications, and alternatives.

In one embodiment, computer system 800 typically includes a monitor 810, computer 820, a keyboard 830, a user input device 840, computer interfaces 850, and the like.

In various embodiments, user input device 840 is typically embodied as a computer mouse, a trackball, a track pad, a joystick, wireless remote, drawing tablet, voice command system, eye tracking system, and the like. User input device 840 typically allows a user to select objects, icons, text and the like that appear on the monitor 810 via a command such as a click of a button or the like.

Embodiments of computer interfaces 850 typically include an Ethernet card, a modem (telephone, satellite, cable, ISDN), (asynchronous) digital subscriber line (DSL) unit, FireWire interface, USB interface, and the like. For example, computer interfaces 850 may be coupled to a computer network, to a FireWire bus, or the like. In other embodiments, computer interfaces 850 may be physically integrated on the motherboard of computer 820, and may be a software program, such as soft DSL, or the like.

In various embodiments, computer 820 typically includes familiar computer components such as a processor 860, and memory storage devices, such as a random access memory (RAM) 870, disk drives 880, a GPU 885, and system bus 890 interconnecting the above components.

In some embodiment, computer 820 includes one or more Xeon microprocessors from Intel. Further, one embodiment, computer 820 includes a UNIX-based operating system.

RAM 870 and disk drive 880 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 885 may be any conventional graphics processing unit that may be user programmable. Such GPUs are available from NVIDIA, ATI, and other vendors. In this example, GPU 885 includes a graphics processor 893, a number of memories and/or registers 895, and a number of frame buffers 897.

FIG. 8 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Further aspects of embodiments of the invention are illustrated in the attached figures. Additional embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for posing computer-generated objects, the method comprising:
   receiving, at one or more computer systems, information indicative of an intersection between a set of at least two points of a first object and a second object;
   determining, with one or more processors associated with the one or more computer systems, a uniform direction in a space embedding the first object in which to displace the set of at least two points of the first object based on a continuous function relating displacement direction in the space embedding the first object to position of all points in the set of at least two points of the first object and position the second object;
   determining, with the one or more processors associated with the one or more computer systems, an amount in the space embedding the first object for each point in the set of at least two points of the first object over which to displace the point of the first object in the uniform direction based on a function that relates displacement amount of the point of the first object to an amount of interpenetration of all points in the set of at least two points of the first object; and
   generating, with the one or more processors associated with the one or more computer systems, information configured to pose the first object based on the uniform direction in the space embedding the first object in which to displace the set of at least two points of the first object and the amount in the space embedding the first object for each point in the set of at least two points of the first object over which to displace the point of the first object.

2. The method of claim 1 wherein determining, with the one or more processors associated with the one or more computer systems, the amount in the space embedding the first object for each point in the set of at least two points of the first object over which to displace the point of the first object in the uniform direction comprises determining the amount in the space embedding the first object for each point in the set of at least two points of the first object over which to displace the point of the first object based on a maximum amount of interpenetration between all points in the set of at least two points of the first object and the second object.

3. The method of claim 1 wherein determining, with the one or more processors associated with the one or more computer systems, the amount in the space embedding the first object for each point in the set of at least two points of the first object over which to displace the point of the first object in the uniform direction comprises:
   determining a maximum distance inside of the second object of a plurality of points along the first object; and
   determining an amount for displacing each point in the plurality of points of the first object in response to the maximum distance inside the second object of the plurality of points.

4. The method of claim 1 wherein determining, with the one or more processors associated with the one or more computer systems, the uniform direction in the space embedding the first object in which to displace the set of at least two points of the first object comprises determining the uniform direction along a shortest path of a plurality of paths in the space embedding the first object in which to exit the second object.

5. The method of claim 1 wherein determining, with the one or more processors associated with the one or more computer systems, the uniform direction in the space embedding the first object in which to displace the set of at least two points of the first object comprises determining the uniform direction orthogonal to a first location where the first object enters the second object and a second location where the first object exits the second object.

6. The method of claim 1 wherein the first object comprises an object of a computer animation display whose motion and position is determined relative to one or more kinematic objects of the computer animation display.

7. The method of claim 1 wherein the first object comprises hair or fur.

8. A non-transitory computer readable medium storing a set of code modules which when executed by a processor of a computer system causes the processor to pose objects in computer animations, the non-transitory computer readable medium comprising:
  code for receiving information indicative of an intersection between a set of at least two points of a first object and a second object;
  code for determining a uniform direction in a space embedding the first object in which to displace the set of at least two points of the first object based on a continuous function relating displacement direction in the space embedding the first object to position of all points in the set of at least two points of the first object and position the second object;
  code for determining an amount in the space embedding the first object for each point in the set of at least two points of the first object over which to displace the point of the first object in the uniform direction based on a function that relates displacement amount of the point of the first object to an amount of interpenetration of all points in the set of at least two points of the first object; and
  code for generating information configured to pose the first object based on the uniform direction in the space embedding the first object in which to displace the set of at least two points of the first object and the amount in the space embedding the first object for each point in the set of at least two points of the first object over which to displace the point of the first object.

9. The non-transitory computer readable medium of claim 8 wherein the code for determining the amount in the space embedding the first object for each point in the set of at least two points of the first object over which to displace the point of the first object in the uniform direction comprises code for determining the amount in the space embedding the first object for each point in the set of at least two points of the first object over which to displace the point of the first object based on a maximum amount of interpenetration between all points in the set of at least two points of the first object and the second object.

10. The non-transitory computer readable medium of claim 8 wherein the code for determining the amount in the space embedding the first object for each point in the set of at least two points of the first object over which to displace the point of the first object in the uniform direction comprises:
  code for determining a maximum distance inside of the second object of a plurality of points along the first object; and
  code for determining an amount for displacing each point in the plurality of points of the first object in response to the maximum distance inside the second object of the plurality of points.

11. The non-transitory computer readable medium of claim 8 wherein the code for determining the uniform direction in the space embedding the first object in which to displace the set of at least two points of the first object comprises code for determining the uniform direction along a shortest path of a plurality of paths in which to exit the second object.

12. The non-transitory computer readable medium of claim 8 wherein the code for determining uniform direction in the space embedding the first object in which to displace the set of at least two points of the first object comprises code for determining the uniform direction orthogonal to a first location where the first object enters the second object and a second location where the first object exits the second object.

13. The non-transitory computer readable medium of claim 8 wherein the first object comprises an object of a computer animation display whose motion and position is determined relative to one or more kinematic objects of the computer animation display.

14. The non-transitory computer readable medium of claim 8 wherein the first object comprises hair or fur.

15. A system for posing objects in computer animations, the system comprising:
  a processor; and
  a memory coupled to the processor, the memory configured to store a set of instructions which when executed by the processor causes the processor to:
    receive information indicative of an intersection between a set of at least two points of a first object and a second object;
    determine a uniform direction in a space embedding the first object in which to displace the set of at least two points of the first object based on a continuous function relating displacement direction in the space embedding the first object to position of all points in the set of at least two points of the first object and position the second object;
    determine an amount in the space embedding the first object for each point in the set of at least two points of the first object over which to displace the point of the first object in the uniform direction based on a function that relates displacement amount of the point of the first object to an amount of interpenetration of all points in the set of at least two points of the first object; and
    generate information configured to pose the first object based on the uniform direction in the space embedding the first object in which to displace the set of at least two points of the first object and the amount in the space embedding the first object for each point in the set of at least two points of the first object over which to displace the point of the first object.

16. The system of claim 15 wherein the set of instructions causes the processor to determine amount in the space embedding the first object for each point in the set of at least two points of the first object over which to displace the point of the first object in the uniform direction based on a maximum amount of interpenetration between the first object and the second object.

17. The system of claim 15 wherein the set of instructions causes the processor to:
  determine a maximum distance inside of the second object of a plurality of points along the first object; and
  determine an amount for displacing each point in the plurality of points of the first object in response to the maximum distance inside the second object of the plurality of points to determine the amount in the space embedding the first object for each point in the set of at least two points of the first object over which to displace the point of the first object in the uniform direction.

18. The system of claim 15 wherein the set of instructions causes the processor to determine the uniform direction along a shortest path of a plurality of paths in which to exit the second object.

19. The system of claim 15 wherein the set of instructions causes the processor to determine the uniform direction orthogonal to a first location where the first object enters the second object and a second location where the first object exits the second object.

20. The system of claim 15 wherein the first object comprises an object of a computer animation display whose motion and position is determined relative to one or more kinematic objects of the computer animation display.

21. The system of claim 15 wherein the first object comprises hair or fur.

* * * * *